3,154,420
GLUTEN PRODUCT AND PROCESS OF PRODUCING THE SAME AND PROCESS OF PRODUCING A BAKED LEAVENED PRODUCT
Joseph G. Ponte, Jr., Stamford, Conn., and Stanley T. Titcomb, Ardsley, N.Y., assignors to Continental Baking Company, Rye, N.Y., a corporation of New York
No Drawing. Filed Mar. 23, 1961, Ser. No. 108,690
9 Claims. (Cl. 99—91)

The present invention has to do with improvements in the production of baked or cooked materials comprising wheat flour and other farinaceous materials, and more particularly to procedures, compositions and materials for improving the physical and baking characteristics of baked leavened goods, such as bread, cake, other sweet leavened goods, and the like.

It is an object of the present invention to improve the crumb characteristics of baked leavened products with respect to grain structure, texture, color, and sometimes volume.

It is another object of the present invention to provide improvements in methods of making baked leavened products so as to improve the above described crumb properties of such products.

Still another object of the present invention is to provide improved methods of making gluten from wheat flour.

A further object of this invention is to provide improved gluten for use as a flour supplement in the production of baked leavened goods.

Other objects of the present invention will in part be made clear and will in part be obvious from the following description.

According to the present invention, it has been discovered that introduction of small amounts of certain organic materials during the production of baked leavened products leads to enhancement of the crumb structure, texture, color, and sometimes volume of the resulting products.

Further in accordance with the present invention, it has been discovered that addition of certain organic materials to wheat flour during the preparation of gluten leads to the production of an improved gluten, which, when used as a supplement for flour in baked leavened food products, enhances the crumb structure, texture, color, and sometimes volume of such products.

Still further in accordance with the present invention, improved gluten has been prepared by adding small amounts of certain organic materials to the flour during the gluten making process.

Further in accordance with the present invention, it has been discovered that addition to wheat flour and other farinaceous materials of certain organic materials or treatment of flours with certain organic materials, enhances the properties of the flour when used to produce baked leavened food products and gluten.

The organic materials suitable for use in the present invention may be described as saturated or unsaturated hydrocarbons having up to and including 12 carbon atoms. Hydrocarbons with straight or branched chains may be used.

Especially good results are achieved with saturated and unsaturated aliphatic hydrocarbons having 2 to 12 and preferably 4 to 12 carbon atoms, and such hydrocarbons are preferred for use. Typical of such hydrocarbons are n-pentane, n-hexane, heptane, octane, nonane, decane, dodecane, 1-heptene, 1-octene, and 1-decene, including isomers thereof, such as isopentane, neopentane, and so forth, and mixtures of the foregoing. Of these hydrocarbons, unusually good results are achieved with n-heptane, and this material is preferred.

The hydrocarbons described are effective in enhancing the above described properties of yeast leavened products when added during the dough mixing stage or stages of such products.

It is also possible, however, to add the hydrocarbons to the rest of the ingredients during a prior or later stage in the process. Also, the hydrocarbons may be admixed with one or more of the ingredients and in this manner introduced into the composition.

In the treatment of wheat flour to make gluten, the hydrocarbons are added to the flour-water mixture during the developing stage, as will be made more clear hereinafter.

The temperature of addition of the hydrocarbons is not critical. Thus, the hydrocarbons may be introduced as solids, liquids or gases. Preferably, however, the use temperature of the hydrocarbon is such that it is a liquid.

The amount of the hydrocarbons added should be kept small. In terms of weight of flour, the amount of hydrocarbons added may vary from about 0.05 to 4.0 percent by weight, and preferably between about 0.2 and 2.4 percent by weight.

The teachings contained herein, for example, may be used with any of the commercial bread making processes, e.g., the sponge and dough process, the straight dough process, and so forth. They are also useful in the commercial preparation of other baked leavened products, as for example, cake and other sweet leavened products.

When the hydrocarbons described herein are used in the production of gluten, and the resulting gluten employed as a flour supplement in bread making, no additional hydrocarbon need be added during the bread making process, although additional hydrocarbons may be added during the ingredient mixing stages, and preferably during the dough development stages, if desired.

In all of the embodiments described herein, the taste of the baked leavened products is at least as good as that of baked leavened products produced following conventional procedures.

The nature of the present invention will be clear from the following examples, which, although illustrative, are not intended to limit the scope of the invention, except as such limitations may appear in the claims.

Example 1

This example illustrates the application of the invention in the sponge and dough process for the production of bread.

The bread has the following formula:

|  | Grams |
| --- | --- |
| Bread flour | 100 |
| Yeast | 2 |
| Yeast food [1] | 0.5 |
| Salt (NaCl) | 2.25 |
| Sugar | 8.0 |
| Lard | 3.0 |
| Emulsifier [2] | 0.5 |
| Nonfat milk solids | 3.5 |
| Water | 65 |
| Dough conditioners [3] | 0.3 |
| n-Heptane | 0.4 |

[1] The composition of the yeast food is as follows:

|  | Weight percent |
| --- | --- |
| Ammonium chloride | 9.7 |
| Calcium sulfate | 25 |
| Potassium bromade | 0.3 |
| NaCl | 25 |
| Starch filler | 40 |

[2] The emulsifier is a mixture of mono-, di-, and tri-glycerides containing about 40 percent mono-glyceride as the active emulsifying agent.

[3] Mixture of flour and calcium peroxide containing 0.6 percent by weight of calcium peroxide.

The bread flour in the above formula is wheat flour which may contain up to about 3 percent by weight of other cereal grains.

Sixty-five weight percent of the flour and all of the yeast and yeast food are mixed with sixty weight percent of the water and allowed to ferment for about 4½ hours.

The resulting fermentation mixture is placed in a suitable mixer, and the remainder of the ingredients, with the n-heptane, are added. Mixing is carried out until a dough of satisfactory consistency is produced.

The resulting dough is allowed to set for 30 minutes and then divided into 19 ounce pieces and the pieces allowed to set for an additional 10 minutes. The dough pieces are then shaped into loaves by suitable shaping means and put into pans, where they are raised or proofed to a height of ¾″ above the pan, which takes about 60 minutes at 95° to 110° F. Following raising, the individual loaves are baked for 20 to 30 minutes at a temperature of 400° to 450° F.

As a control, the same procedure is employed to make bread, with the exception that no n-heptane is added.

A comparison of the control loaf and the loaf made by the addition of n-heptane shows that the loaf made by the addition of n-heptane has a much finer grain structure, is superior in texture, and is considerably whiter than the control loaf.

*Example 2*

This example illustrates the working of the invention in the straight dough process for the production of bread.

The bread formula is the same as that indicated above in Example 1.

All of the ingredients indicated in Example 1 including n-heptane, are mixed and fermented for 2½ to 3½ hours. The resulting dough is processed in the manner described in Example 1. Results similar to those described in Example 1 are achieved.

*Example 3*

This example illustrates the working of the invention in the production of cake.

The following cake formula is used:

| | Percent by weight |
|---|---|
| Granulated sugar | 31.6 |
| Cake flour | 31.0 |
| Mono and diglycerides | 1.6 |
| Salt | .8 |
| Nonfat milk solids | 2.3 |
| Whole eggs | 11.6 |
| Vanilla solution | .4 |
| Baking powder | 2.1 |
| Water | 18.6 |
| | 100.0 |

All of the ingredients except the baking powder and half of the water are placed in a mixer and mixed for 5 minutes at beating speed. The baking powder, remainder of the water, and 0.125 ml. of n-heptane per 100 g. of batter are added to the batter, and the resulting mix agitated for two minutes at folding speed.

The resulting battery is then separated into cake sized portions and baked at 375° to 425° for 20 to 30 minutes.

The resulting cake has finer grain structure and improved color when compared to the crumb of cake produced by following the identical procedure, but without the addition of n-heptane.

In making gluten from wheat flour, the wheat flour is mixed with water and the amount of hydrocarbons indicated herein to separate the starch and suspend it in the aqueous layer. The starch is then separated from the gluten by conventional techniques, as by screening, decantation, and so forth.

In the preferred method of producing gluten, the wheat flour, hydrocarbons and between about 0.25 and 2 pounds of water per pound of flour are mixed to form a thick slurry. Mixing times of between about 5 and 15 minutes are generally sufficient. The slurry is then rapidly agitated for an additional 5 to 15 minutes, and diluted with an additional 0.5 to 4 pounds of water per pound of flour, and rapidly agitated for another 5 to 15 minutes. Agitation is then stopped and the water layer containing the starches decanted.

The dilution, agitation and decantation steps may be repeated as frequently as desired. Following final decantation of the water, a rubbery mass of crude gluten remains.

In preparing gluten, it is preferable to use water having a temperature of less than 100° F., and preferably less than about 65° F.; or between about 40° and 60° F. The use of relatively cold water discourages bacterial action which might adversely affect gluten quality.

The quantities of water added, the mixing and agitation times, and the number of starch removal steps will, of course, depend upon the quality of gluten desired. In general, economic criteria will be controlling so far as these variables are concerned.

*Example 4*

Two pounds of good baking quality wheat flour are mixed with 1¼ pounds of cold water (40° to 50° F.) and 10 ml. of n-heptane. The resulting mixture is developed into a thick slurry by mixing for 10 minutes. After developing, an additional 2 pounds of water are added, and the resulting mixture agitated for 5 minutes. Agitation is then stopped. The water layer containing the separated starches is decanted and four additional pounds of water added. This mixture is again agitated for 5 minutes, followed by decantation of the water. This latter step is repeated two additional times.

Following final decantation of the water, a rubbery mass of crude gluten remains. The crude gluten may be suitably dehydrated, as by drum drying or freeze drying, and may be pulverized in a hammer mill or otherwise suitably comminuted.

As a control, crude gluten is produced following the same procedure, with the exception that no n-heptane is added.

The crude gluten produced is used as a supplement for flour in the manufacture of bread.

Bread having the formula of Example 1 is made with the following exceptions:

Low grade baking flour is used, and 10 percent of the flour is replaced with 10 percent by weight (dry basis) of crude gluten prepared in the manner described hereinabove. The mixing and baking procedure is the same as that described in Example 1, with the exception that no additional n-heptane is added.

A comparison of the loaf made using the control gluten with that made using gluten prepared from the process in which n-heptane was used shows that the latter loaf has greater volume, finer grain structure, superior texture and is whiter than the control loaf.

*Example 5*

Examples 1 and 4 are repeated, with the exception that the following hydrocarbons are substituted for n-heptane: n-pentane, n-hexane, n-octane, n-nonane, n-decane, dodecane, 1-heptene, 1-octene and 1-decene. Results similar to those of Examples 1 and 4, respectively, are achieved.

The particular ingredients employed in making the baked leavened products described hereinabove form no part of the present invention since any suitable formula for the baked goods described herein may be used. The basic ingredients used in the manufacture of bread, for example, are flour, water, sodium chloride and yeast. For commercial bread, sugar, milk, shortening and a suitable emulsifier for the shortening, such as glycerides, are conventionally added to these basic ingredients, and the present invention is particularly suitable with bread formulae containing such additional ingredients. For cake, or other sweet leavened products, eggs as well as other enriching agents may also be added. Ordinarily, in making cake, chemical leavening agents, such as baking powder, rather than yeast are employed.

Although in the method of making gluten described herein, the wheat flour is treated with water to separate the starch from the proteins, the starch being removed from the environment by decanting the aqueous layer, any suitable method of making gluten is applicable to the present invention. The important thing, so far as the present invention is concerned, is that the flour, during the developing stage, be treated with or admixed with the amounts of the hydrocarbons indicated herein. Preferably, the hydrocarbons are added to the flour during the initial development of the flour to remove the starch.

In the method described hereinabove for the manufacture of gluten from wheat flour, the amount of water used, number of treatments with water, time of treatment, and so forth, will depend primarily upon the quality of gluten desired. The amount of water used, number of cycles, and time of treatment, should, however, be sufficient to separate substantial amounts of the starch from the wheat flour.

The invention in its broader aspects is not limited to the specific details shown and described but departures may be made therefrom within the scope of the accompanying claims without departing from the principles of the invention and without sacrificing its chief advantages.

What is claimed:

1. In a process of producing baked leavened products, the improvement of enhancing crumb characteristics including grain structure which comprises developing the dough from ingredients including wheat flour and from about 0.05 and 4.0 percent by weight of the dough of a member selected from the group consisting of saturated and unsaturated aliphatic hydrocarbons, and mixtures of the foregoing, said member having up to and including 12 carbon atoms.

2. The improvement of claim 1 wherein the amount of said member introduced is between about 0.2 and 2.4 percent by weight of the flour.

3. The improvement of claim 1 wherein said member is n-heptane.

4. In a process of producing baked leavened products, the improvement of enhancing crumb characteristics including grain structure which comprises developing a dough from ingredients including water, sodium chloride, leavening agent, wheat flour, shortening, and between about 0.05 and 4.0 percent by weight of flour of a member selected from the group consisting of saturated and unsaturated aliphatic hydrocarbons, including mixtures of the foreoging, said member having 4 to 12 carbon atoms.

5. In a method of developing gluten by separation of starch from wheat flour, the improvement which comprises developing the gluten from wheat flour in the presence of between about 0.05 and 4.0 percent by weight of the flour of a member selected from the group consisting of saturated and unsaturated aliphatic hydrocarbons, and mixtures of the foregoing, said member having up to and including 12 carbon atoms.

6. The improvement of claim 4 wherein said member is a saturated aliphatic hydrocarbon.

7. In a method of developing gluten by separation of starch from wheat flour, the improvement which comprises developing the gluten from the wheat flour in the presence of between about 0.05 and 4.0 percent by weight of the wheat flour of a member selected from the group consisting of saturated and unsaturated aliphatic hydrocarbons, and mixtures of the foregoing, said member having up to and including 12 carbon atoms, and then separating starch from the wheat flour.

8. A method which comprises mixing wheat flour, water and between about 0.05 and 4 percent by weight of the flour of a member selected from the group consisting of saturated and unsaturated aliphatic hydrocarbons, and mixtures of the foregoing, said member containing 4 to 12 carbon atoms to separate starch from the wheat flour and suspend it in the water layer and then separating the starch with the water layer to produce crude gluten.

9. Gluten prepared by the method of claim 8.

References Cited in the file of this patent

UNITED STATES PATENTS

| | | |
|---|---|---|
| 564,398 | Templeton | July 21, 1896 |
| 1,754,914 | Stoddard | Apr. 15, 1930 |
| 2,863,771 | Ferrara | Dec. 9, 1958 |

FOREIGN PATENTS

| | | |
|---|---|---|
| 266,967 | Great Britain | Mar. 10, 1927 |

OTHER REFERENCES

"Cereal Chemistry," March 1940, pp. 243–245.
"Cereal Chemistry," July 1940, pp. 491–493.
"Hackh's Chemical Dictionary," 3rd ed., 1944, The Blakiston Co. (Phil.), p. 365.
"The Condensed Chemical Dictionary," Rose et al., 5th ed., 1956, Reinhold Pub. Corp. (New York), p. 1179.